(12) United States Patent
Kimura et al.

(10) Patent No.: US 11,978,481 B2
(45) Date of Patent: May 7, 2024

(54) MOTOR INCLUDING YOKE FLANGE PORTION AND DISK DRIVE DEVICE INCLUDING SAME

(71) Applicant: Nidec Corporation, Kyoto (JP)

(72) Inventors: Naoyuki Kimura, Kyoto (JP); Kazuhiro Sato, Kyoto (JP); Tomoki Uchibori, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 18/136,958

(22) Filed: Apr. 20, 2023

(65) Prior Publication Data
US 2023/0352049 A1    Nov. 2, 2023

(30) Foreign Application Priority Data

Apr. 27, 2022   (JP) ................................. 2022-073629

(51) Int. Cl.
| | |
|---|---|
| *G11B 19/20* | (2006.01) |
| *F16C 17/10* | (2006.01) |
| *F16C 33/10* | (2006.01) |
| *F16C 17/02* | (2006.01) |

(52) U.S. Cl.
CPC ........ *G11B 19/2036* (2013.01); *F16C 33/107* (2013.01); *F16C 17/026* (2013.01); *F16C 17/107* (2013.01); *F16C 2370/12* (2013.01)

(58) Field of Classification Search
CPC .... F16C 33/107; F16C 17/107; F16C 17/026; F16C 2370/12; G11B 19/2036
See application file for complete search history.

(56) References Cited

U.S. PATENT DOCUMENTS

| | | | | |
|---|---|---|---|---|
| 8,665,556 | B2* | 3/2014 | Yamada ................ | F16C 33/745 310/90 |
| 8,729,757 | B2* | 5/2014 | Cheong ................ | F16C 17/026 310/90 |
| 9,613,651 | B1* | 4/2017 | Mizukami .......... | G11B 19/2036 |
| 2007/0194644 | A1* | 8/2007 | Kanatani ................ | H02K 5/163 310/90 |
| 2008/0061646 | A1* | 3/2008 | Kodama ................. | F16C 17/10 310/90 |
| 2010/0202084 | A1* | 8/2010 | Watanabe ............ | G11B 17/028 360/99.08 |

(Continued)

FOREIGN PATENT DOCUMENTS

JP   2021-087279 A   6/2021

*Primary Examiner* — Brian E Miller
(74) *Attorney, Agent, or Firm* — Keating & Bennett, LLP

(57) ABSTRACT

A motor includes a shaft, a base portion, a stator, and a rotor. The shaft extends along a central axis extending in an axial direction. The base portion extends in a radial direction on one axial direction side of the shaft. The stator is located in another axial direction with respect to the base portion and surrounds the shaft. The rotor is rotatable around the central axis. The rotor includes a rotor tube portion, a magnet, and a rotor flange portion. The rotor tube portion surrounds the stator. The magnet is opposed to the stator in the radial direction. The rotor flange portion extends in a radially outer direction from one axial end portion of the rotor tube portion. The rotor tube portion includes a yoke tube portion and a hub tube portion. The yoke tube portion is located on a radially inside surface of the hub tube portion.

13 Claims, 10 Drawing Sheets

(56) References Cited

U.S. PATENT DOCUMENTS

| | | | | |
|---|---|---|---|---|
| 2010/0226046 | A1* | 9/2010 | Saito | G11B 17/028 360/245.2 |
| 2010/0231068 | A1 | 9/2010 | Yamazaki | G11B 19/2036 310/71 |
| 2010/0302673 | A1* | 12/2010 | Nishitani | G11B 19/2036 360/71 |
| 2011/0033143 | A1* | 2/2011 | Yamada | F16C 17/045 384/107 |
| 2011/0033144 | A1* | 2/2011 | Kodama | F16C 17/107 384/112 |
| 2012/0212092 | A1* | 8/2012 | Goto | G11B 19/2036 310/90 |
| 2013/0033782 | A1* | 2/2013 | Park | H02K 1/187 310/90 |
| 2014/0077643 | A1* | 3/2014 | Sodeoka | F16C 33/107 310/90 |
| 2014/0192438 | A1* | 7/2014 | Kodama | F16C 17/107 360/99.08 |
| 2019/0214052 | A1* | 7/2019 | Sato | H02K 1/2791 |
| 2019/0214868 | A1* | 7/2019 | Miyake | H02K 21/24 |
| 2019/0379255 | A1* | 12/2019 | Moro | H02K 5/1675 |
| 2020/0106332 | A1* | 4/2020 | Iguchi | H02K 5/1677 |

* cited by examiner

[Fig. 1]
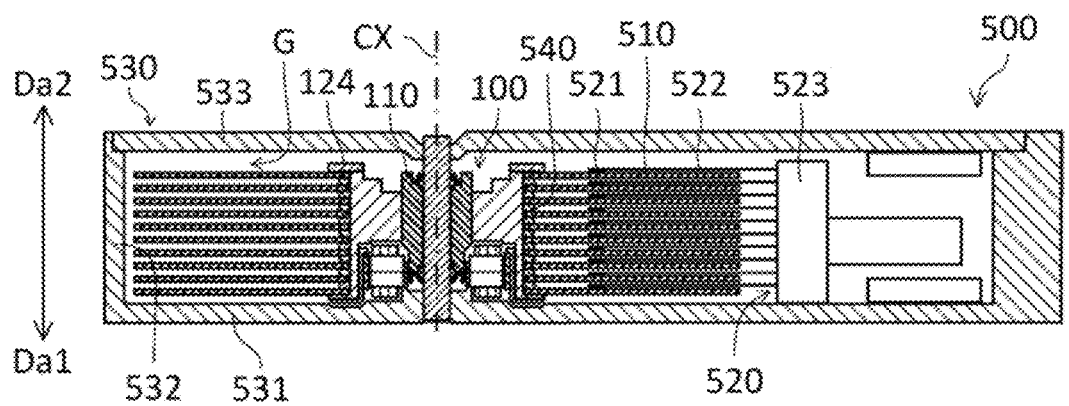
[Fig. 2]
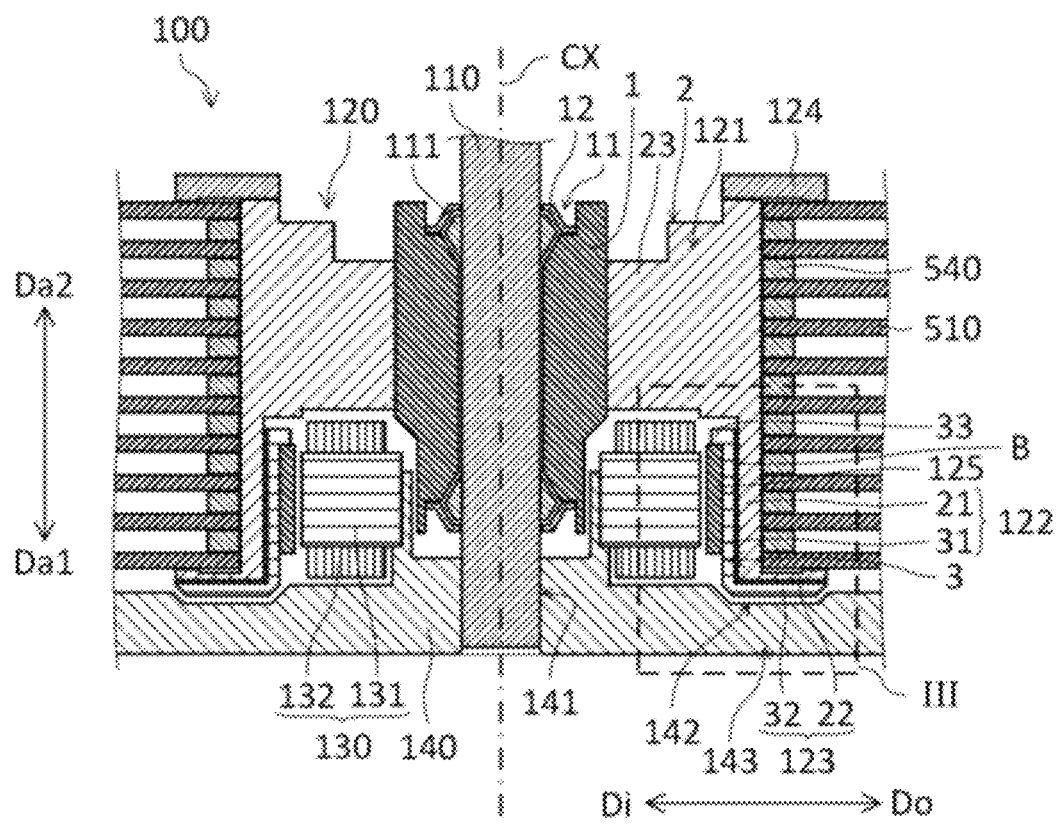

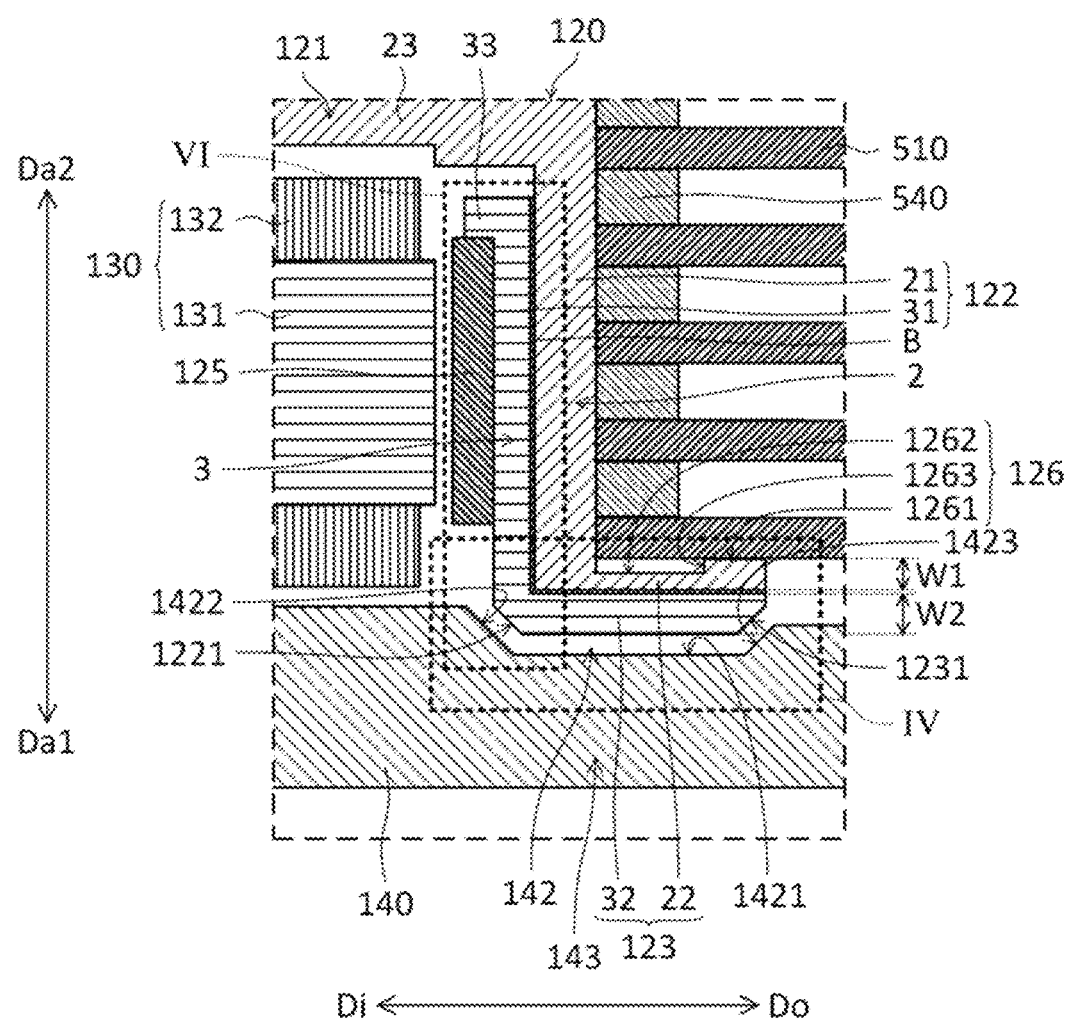
[Fig. 3]

[Fig. 4]
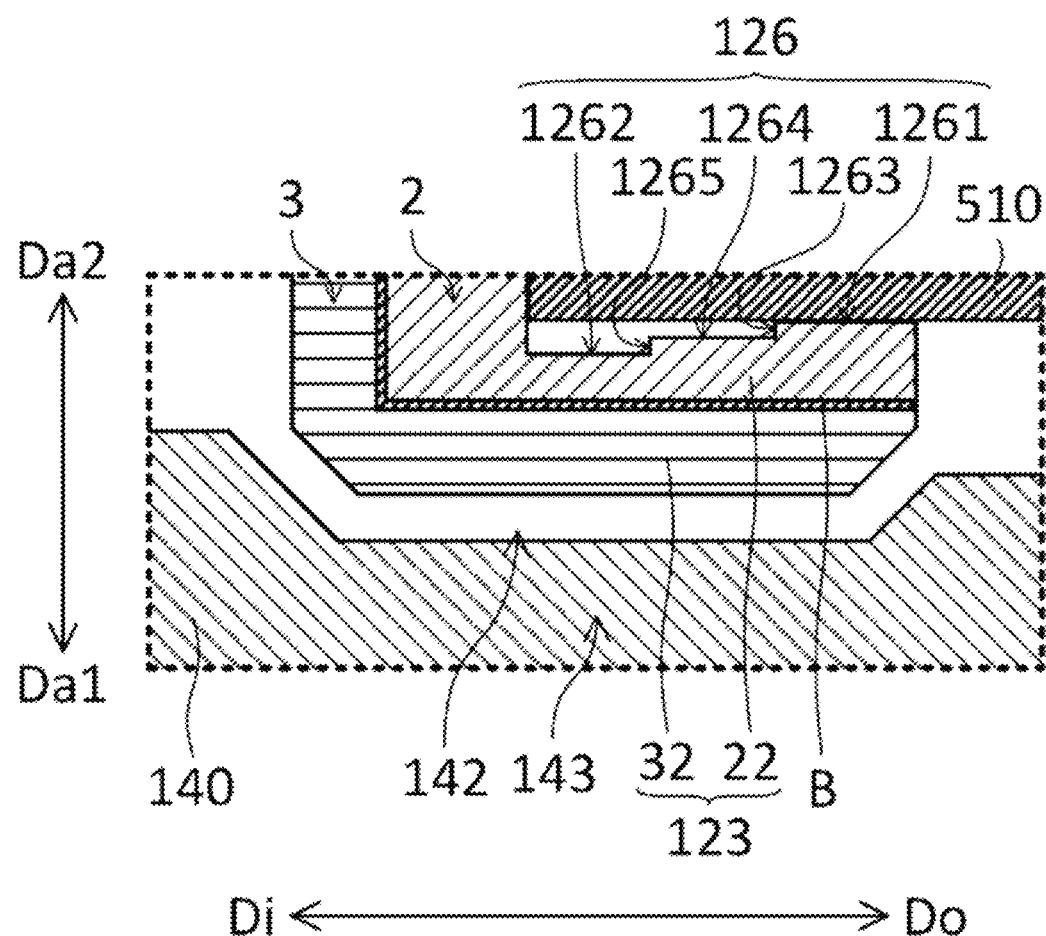

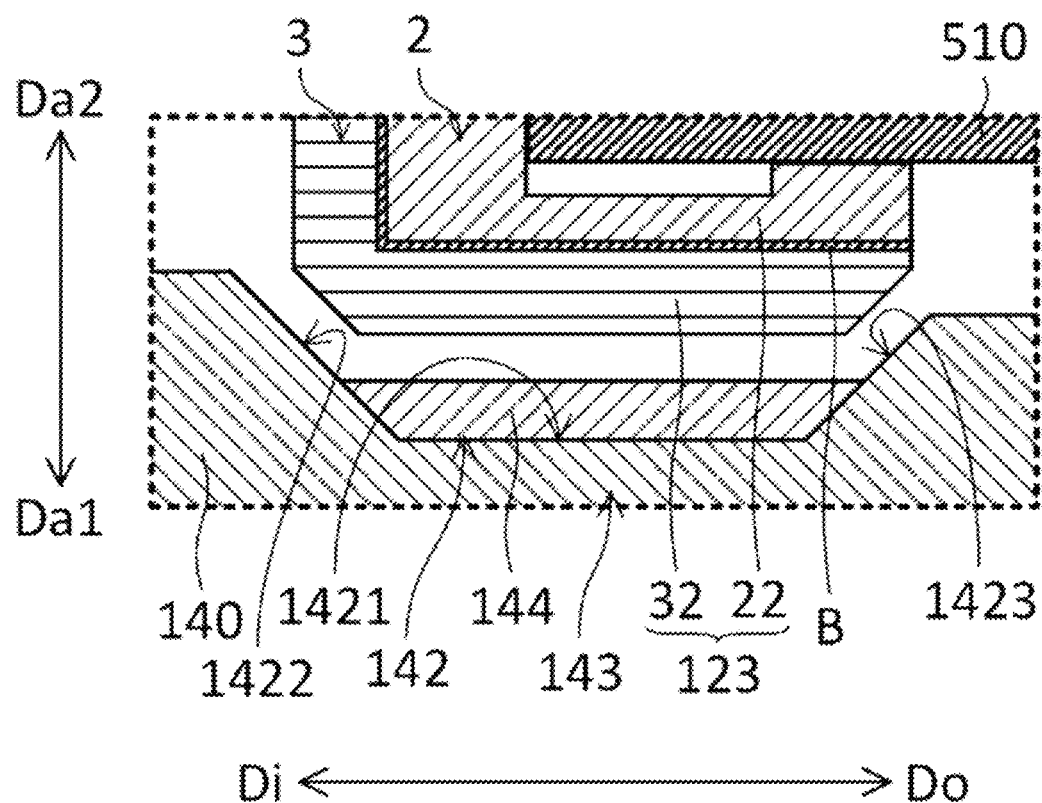
[Fig. 5 A]

[Fig. 5 B]
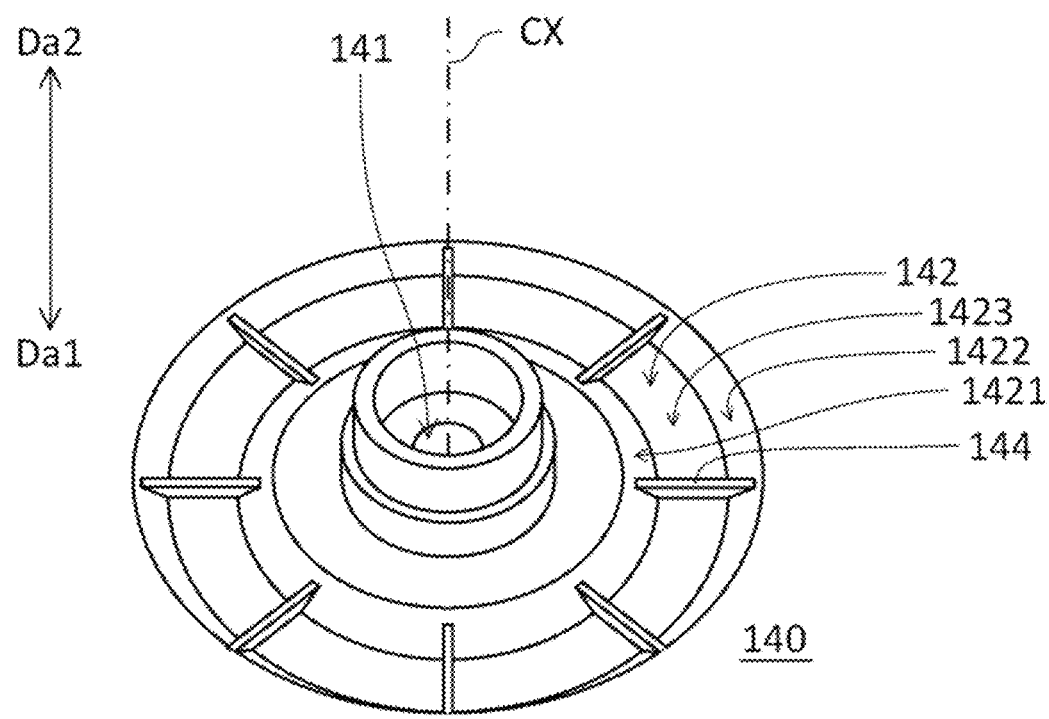

[Fig. 6 A]
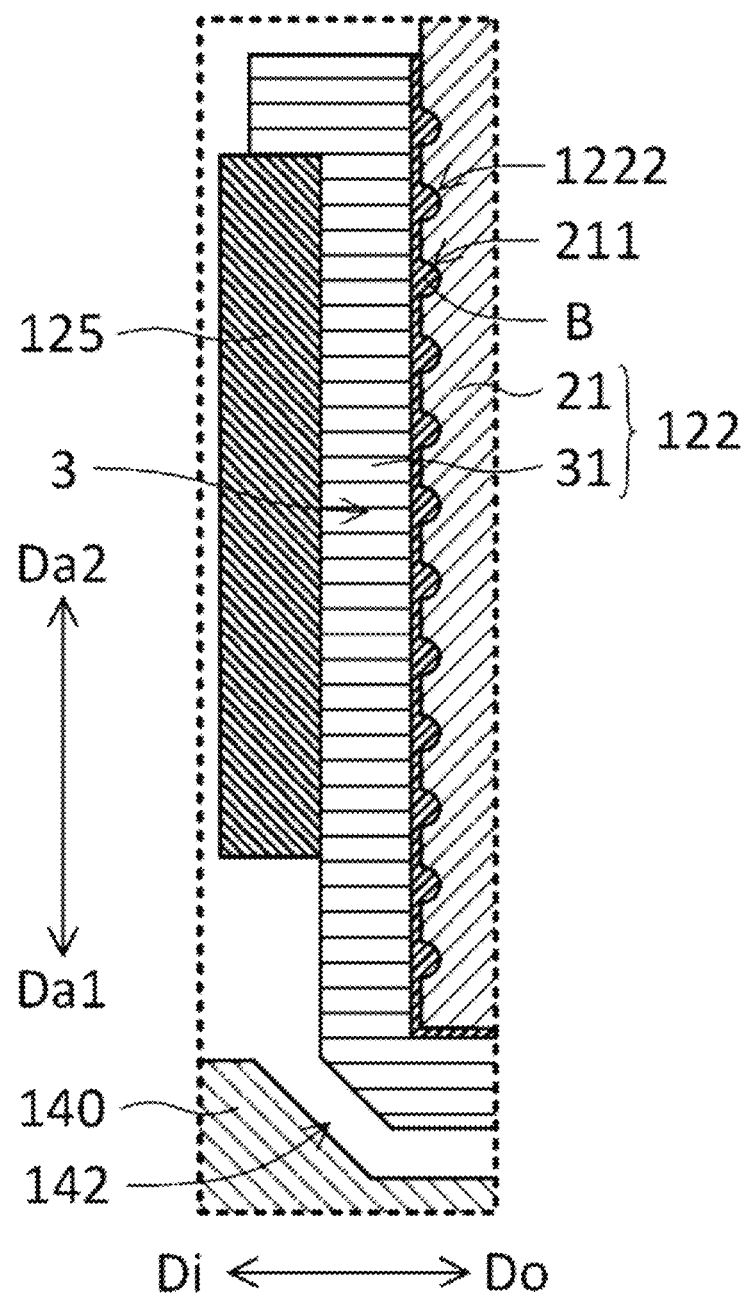

[Fig. 6 B]
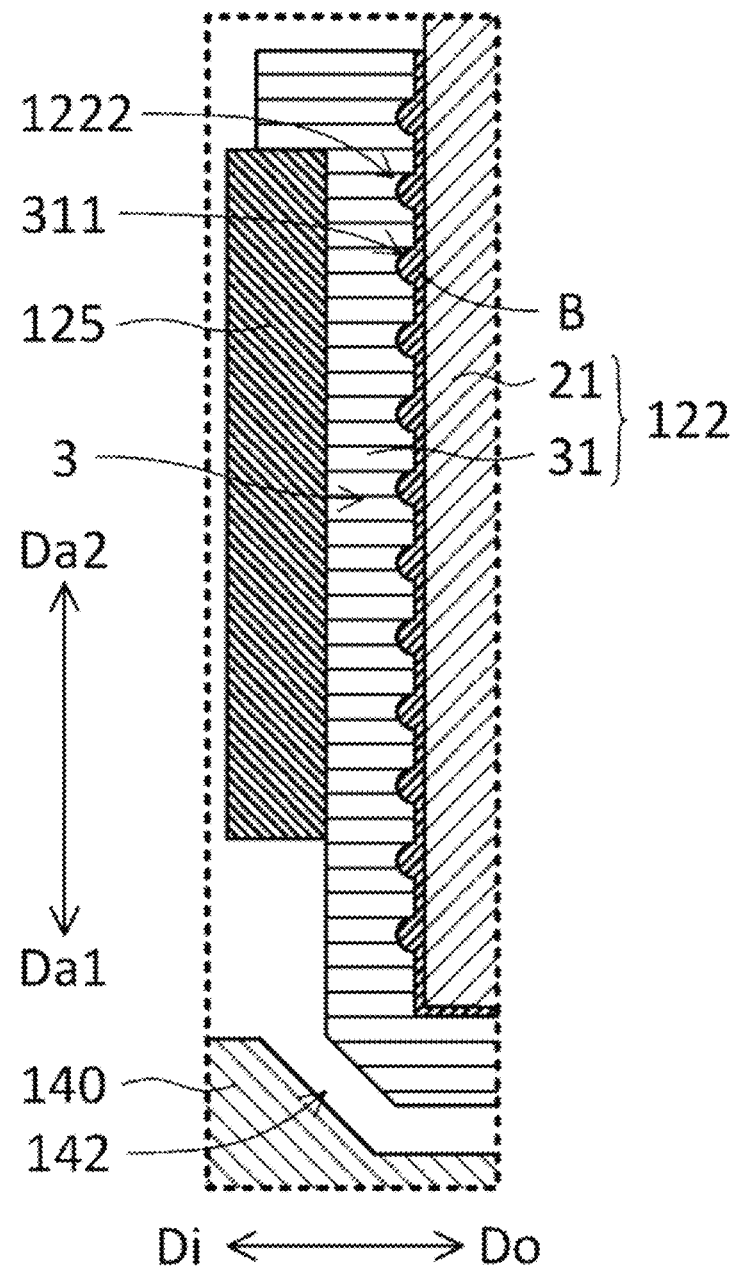

[Fig. 6 C]
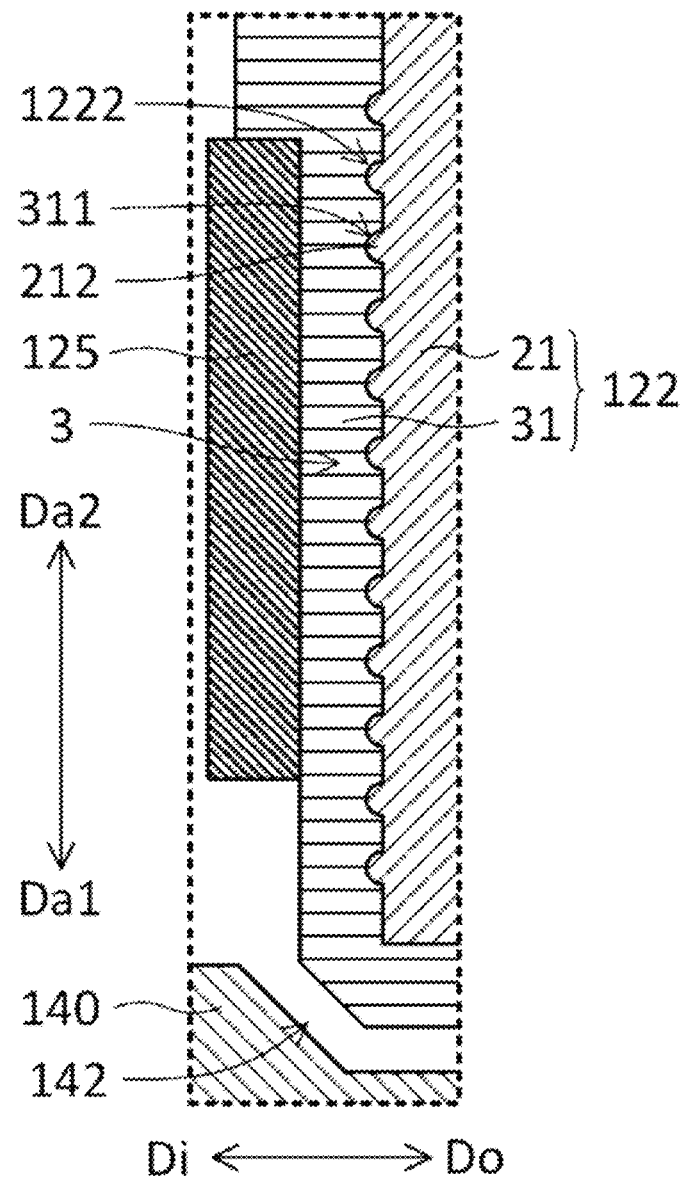

[Fig. 7]
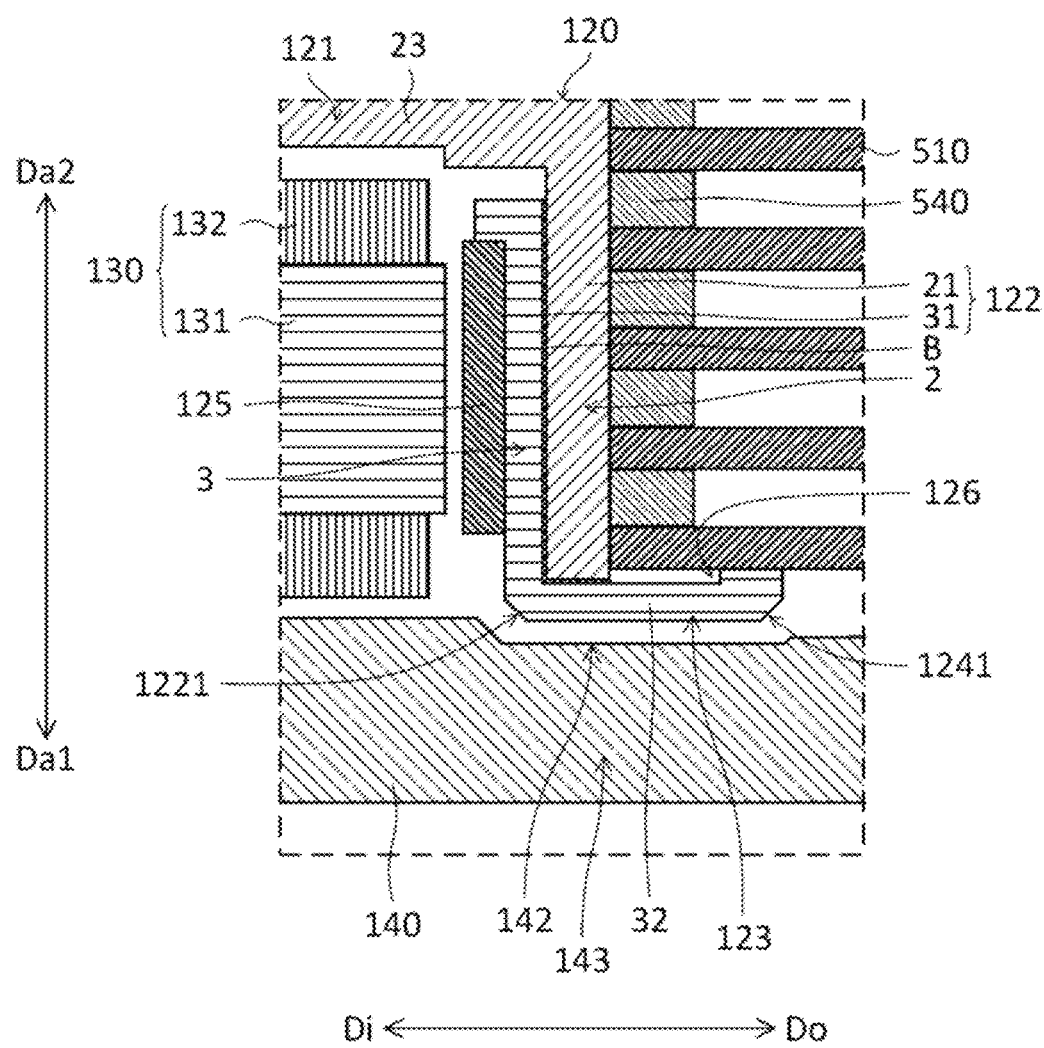

[Fig. 8]
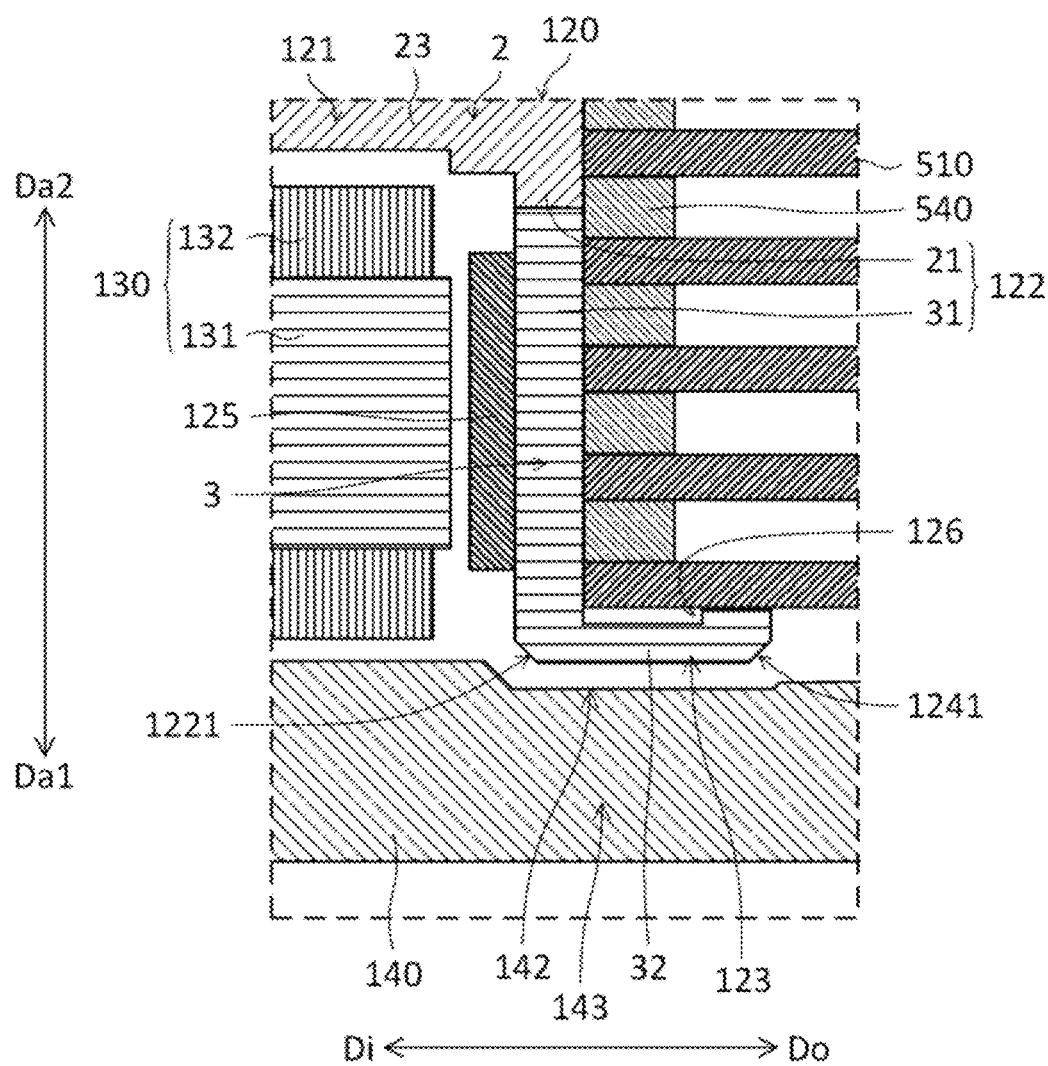

MOTOR INCLUDING YOKE FLANGE PORTION AND DISK DRIVE DEVICE INCLUDING SAME

CROSS-REFERENCE TO RELATED APPLICATIONS

The present application claims priority under 35 U.S.C. § 119 to Japanese Patent Application No. 2022-073629, filed on Apr. 27, 2022, the entire contents of which are hereby incorporated herein by reference.

FIELD OF THE INVENTION

The present disclosure relates to a motor and a disk drive device.

BACKGROUND

A conventional disk drive device such as a hard disk drive is mounted with a spindle motor that rotates a disk-shaped storage medium. In a fixing portion of the spindle motor, for example, a shaft is fixed to a base portion. A rotating portion has a hub rotatably supported by a conical bearing member fixed to the shaft. The hub has an outer cylindrical portion including an inner circumferential surface side to which a rotor magnet is fixed. A flange portion extending radially outward is formed on a periphery of a lower end portion of the outer cylindrical portion. The flange portion functions as a disk placement portion. In addition, an annular recess that accommodates a part of the flange portion is formed on an upper surface of the base portion.

In recent years, a required data capacity has increased, and thus the number of disks mounted on the motor has also tended to increase. In order to mount more disks, it is necessary to bring the lowermost disk closer to the base portion. Since the flange portion is disposed at a lower position accordingly, it is necessary to make the annular recess deeper.

However, when the annular recess is made deeper, a thickness of the base portion becomes thinner right under the annular recess. Thus, vibration and noise are likely to occur in the thin portion when the motor is driven. On the other hand, although the annular recess is made shallower by making the flange portion thin, there is a risk that the flange portion may be deformed when the disk is mounted and clamped due to a decrease in rigidity of the flange portion.

SUMMARY

A motor according to an example embodiment of the present disclosure includes a shaft, a base portion, a stator, and a rotor. The shaft extends along a central axis extending in an axial direction. The base portion extends in a radial direction on one axial direction side of the shaft. The stator is located in another axial direction with respect to the base portion and surrounds the shaft. The rotor is rotatable around the central axis. The rotor includes a rotor tube portion, a magnet, and a rotor flange portion. The rotor tube portion surrounds the stator. The magnet is opposed to the stator in the radial direction. The rotor flange portion extends in a radially outer direction from one axial end portion of the rotor tube portion. The rotor tube portion includes a yoke tube portion and a hub tube portion. The yoke tube portion is located on a radially inside surface of the hub tube portion. The hub tube portion holds the magnet via the yoke tube portion. The rotor flange portion includes at least a first yoke flange portion. The first yoke flange portion extends in the radially outer direction from one axial end portion of the yoke tube portion.

A disk drive device according to an example embodiment of the present disclosure includes the motor according to the above-described preferred embodiment, a storage medium that has a disk shape, and an access assembly. The storage medium is supported by the rotor of the motor. The access assembly performs at least one of reading and writing of information to the storage medium.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a sectional view illustrating a configuration example of a disk drive device according to a preferred embodiment of the present disclosure.

FIG. 2 is a sectional view illustrating a configuration example of a motor according to a preferred embodiment of the present disclosure.

FIG. 3 is an enlarged view of a portion III surrounded by a broken line in FIG. 2.

FIG. 4 is an enlarged view of a portion IV surrounded by a broken line in FIG. 3 illustrating the rotor flange portion according to a preferred embodiment of the present disclosure.

FIG. 5A is an enlarged view of a portion IV surrounded by a broken line in FIG. 3 illustrating a configuration example of a rib according to a preferred embodiment of the present disclosure as viewed from a circumferential direction.

FIG. 5B is a perspective view of a base recess in which the ribs are located.

FIG. 6A is an enlarged view of a portion VI surrounded by a broken line in FIG. 3 illustrating a first arrangement example of a groove portion according to a preferred embodiment of the present disclosure.

FIG. 6B is an enlarged view of a portion VI surrounded by a broken line in FIG. 3 illustrating a second arrangement example of the groove portion.

FIG. 6C is an enlarged view of a portion V surrounded by a broken line in FIG. 3 illustrating a third arrangement example of the groove portion.

FIG. 7 is an enlarged view of a portion III surrounded by a broken line in FIG. 2 illustrating a configuration example of the rotor flange portion according to a first modification of a preferred embodiment of the present disclosure.

FIG. 8 is an enlarged view of a portion III surrounded by a broken line in FIG. 2 illustrating a configuration example of the rotor flange portion according to a second modification of a preferred embodiment of the present disclosure.

DETAILED DESCRIPTION

Example embodiments will be described with reference to the drawings hereinafter.

In the present specification, a direction parallel to a central axis CX is referred to as an "axial direction" in a disk drive device 500 and a motor 100. In the axial directions, a direction from a rotor 120 to a base portion 140 to be described later is referred to as an "axially one direction Da1", and a direction from the base portion 140 to the rotor 120 is referred to as an "axially the other direction Da2".

A direction orthogonal to the central axis CX is referred to as a "radial direction", and a rotation direction around the central axis CX is referred to as a "circumferential direction". In the radial directions, a direction approaching the central axis CX is referred to as a "radially inner direction Di", and a direction away from the central axis CX is referred to as a "radially outer direction Do". In each component, an end portion in the radially inner direction Di is referred to as a "radially inner end portion", and an end portion in the radially outer direction Do is referred to as a "radially outer end portion". Further, in side surfaces of each component, a side surface facing in the radially inner direction Di is referred to as a "radially inside surface", and a side surface facing in the radially outer direction Do is referred to as a "radially outside surface".

In the present specification, an "annular shape" includes a shape continuously connected without a break over the entire region in the circumferential direction around the central axis CX, and a shape having one or more breaks in a part of the entire region around the central axis CX. The "annular shape" also includes a shape that draws a closed curve in a curved surface intersecting the central axis CX around the central axis CX.

In a positional relationship between any one of an azimuth, a line, and a plane and another one of them, "parallel" includes not only a state in which both of them do not intersect at all no matter how long they extend, but also a state in which they are substantially parallel. Each of "perpendicular" and "orthogonal" includes not only a state in which the two intersect each other at 90 degrees, but also a state in which they are substantially perpendicular and a state in which they are substantially orthogonal. In other words, each of "parallel", "perpendicular", and "orthogonal" includes a state in which the positional relationship between the two permits an angular deviation of a degree not departing from the spirit of the present disclosure.

It is to be noted that the above names are names used merely for description, and are not intended to limit actual positional relationships, directions, names, and the like.

FIG. 1 is a sectional view illustrating a configuration example of a disk drive device 500. FIG. 1 shows a sectional structure of the disk drive device 500 cut along a virtual plane including a central axis CX.

The disk drive device 500 of the present example embodiment is a hard disk drive. The disk drive device 500 includes a motor 100, storage media 510, and an access assembly 520. Each of the storage media 510 has a disk shape and is supported by a rotor 120 to be described later of the motor 100. The access assembly 520 performs at least one of reading and writing of information to the storage media 510. According to the disk drive device 500, as will be described later, an axial thickness of a rotor flange portion 123 is further reduced while rigidity of the rotor flange portion 123 is maintained in the motor 100. By replacement of reducing the thickness of the rotor flange portion 123 with increasing a thickness of a base portion 140, rigidity of the base portion 140 is improved. In addition, generation of vibration and noise of the motor 100 is effectively suppressed.

The storage medium 510 is a medium in which the information is recorded. In the present example embodiment, a material of the storage medium 510 is aluminum or an alloy of aluminum. It is to be noted that the number of storage media 510 is 10 as illustrated in FIG. 1 in the present example embodiment, but is not limited to this example. The number of storage media 510 may be the singular number or the plural number other than 10. The storage media 510 are disposed on a radially outside surface of the rotor 120 and are layered in an axial direction via spacers 540 interposed between the storage media 510. The storage media 510 are rotatably supported around the central axis CX by the motor 100. In addition, when the disk drive device 500 operates, the storage media 510 rotate by driving of the motor 100.

The access assembly 520 includes a plurality of heads 521, a plurality of arms 522, and a head moving mechanism 523. Each head 521 approaches a surface of the storage medium 510 and magnetically performs at least one of reading of the information recorded in the storage medium 510 and writing of the information to the storage medium 510. Each head 521 is disposed at one end portion (in other words, an end portion of the arm 522 on the motor 100 side, that is, a radially inner end portion with respect to the central axis CX) of the arm 522, and is supported by the arm 522. The other end portion of the arm 522 is an end portion (in other words, a radially outer end portion with respect to the central axis CX) of the arm 522 on the head moving mechanism 523 side, and is supported by the head moving mechanism 523.

The disk drive device 500 further includes a housing 530. The housing 530 accommodates the motor 100, the storage media 510, and the access assembly 520. The housing 530 includes a bottom plate 531, a side plate 532, and a top plate 533. The bottom plate 531 and the top plate 533 expand in a direction perpendicular to the central axis CX. The motor 100 is disposed on the bottom plate 531. The side plate 532 extends from an outer edge part of the bottom plate 531 in another axial direction Da2 and surrounds the motor 100, the storage media 510, and the access assembly 520. In the present example embodiment, although the side plate 532 is integrated with the bottom plate 531, the side plate 532 may be separated from the bottom plate 531. The top plate 533 is disposed on an axially the other end portion of the side plate 532 and covers an opening at the axially the other end portion of the side plate 532. The bottom plate 531 and the base portion 140 are combined with the side plate 532 and the top plate 533 so that airtightness in the housing 530 is not impaired.

The bottom plate 531, the side plate 532, and the top plate 533 form a sealed space inside the housing 530 together with the base portion 140 of the motor 100. The housing 530 (that is, the above-described sealed space) is filled with a gas G having a density lower than that of air. Helium gas is used as the gas G in the present example embodiment. However, the gas G is not limited to this example, and a hydrogen gas, a mixed gas of He and H2, or the like may be used as the gas G. Performing as described above makes it possible to reduce fluid resistance acting on the rotor 120 and the storage media 510 when the motor 100 and the storage media 510 are driven to rotate.

A configuration of the motor 100 will be described with reference to FIGS. 1 to 3. FIG. 2 is a sectional view illustrating a configuration example of the motor 100. FIG. 2 shows a sectional structure of the motor 100 cut along a virtual plane including the central axis CX. FIG. 3 is an enlarged view of a portion III surrounded by a broken line in FIG. 2.

The motor 100 is a DC spindle motor in the present example embodiment. The motor 100 includes a shaft 110, the rotor 120, a stator 130, and the base portion 140.

The shaft 110 has a columnar shape and extends along the central axis CX. The central axis CX extends along the axial direction. As described above, the motor 100 includes the shaft 110. The shaft 110 rotatably supports the rotor 120 around the central axis CX. The shaft 110 is formed of, for example, metal such as stainless steel. One axial end portion of the shaft 110 is connected to the base portion 140. The axially the other end portion of the shaft 110 is fixed to the top plate 533 of the housing 530.

A pair of thrust tube portions 111 are disposed on a radially outside surface of the shaft 110 at both axial end portions of the shaft 110. The motor 100 further includes the pair of thrust tube portions 111. Each of the pair of thrust tube portions 111 has a tubular shape extending in the axial direction. Each thrust tube portion 111 may be integrated with the shaft 110 or may be separated from the shaft 110. Each thrust tube portion 111 is axially opposed to a sleeve 1, which will be described later, of the rotor 120 and has a gap with the sleeve 1.

In the present example embodiment, the shaft 110 is a fixed shaft not to be rotatable. However, this example does not exclude a configuration in which the shaft 110 is rotatable. The shaft 110 may be rotatable with the rotor 120, for example. At this time, the axially one end portion of the shaft 110 may be rotatably supported to the base portion 140 via a bearing member.

The rotor 120 is rotatable around the central axis CX. As described above, the motor 100 includes the rotor 120. The rotor 120 has a rotor annular portion 121, a rotor tube portion 122, the rotor flange portion 123, a clamp member 124, and a magnet 125.

The rotor annular portion 121 surrounds the shaft 110 around the central axis CX.

The rotor tube portion 122 has a tubular shape extending in an axially one direction Da1 from a radially outer end portion of the rotor annular portion 121, and is disposed in a radially outer direction Do with respect to the stator 130. As described above, the rotor 120 has the rotor tube portion 122. The rotor tube portion 122 surrounds the stator 130.

In the present example embodiment, the rotor tube portion 122 has a first surface 1221. In other words, the rotor 120 has the first surface 1221. The first surface 1221 is disposed on a radially inner end portion of one axial end portion of the rotor tube portion 122 and extends in a circumferential direction. The first surface 1221 extends straight toward the other axial direction Da2 as the first surface 1221 goes in a radially inner direction Di as viewed from the circumferential direction. The first surface 1221 has an annular shape surrounding the central axis CX.

The rotor flange portion 123 expands in the radially outer direction Do from the axially one end portion of the rotor tube portion 122 and extends in the circumferential direction. As described above, the rotor 120 has the rotor flange portion 123. As described later, the rotor flange portion 123 has at least a first yoke flange portion 32.

Further, in the present example embodiment, the rotor flange portion 123 has a second surface 1231. In other words, the rotor 120 has the second surface 1231. The second surface 1231 is disposed on a radially outer end portion of one axial end portion of the rotor flange portion 123 and extends in the circumferential direction. The second surface 1231 extends straight toward the other axial direction Da2 as the second surface 1231 goes in the radially outer direction Do as viewed from the circumferential direction. The second surface 1231 has an annular shape surrounding the central axis CX.

It is to be noted that the present disclosure is not limited to the above example, and either the first surface 1221 or the second surface 1231 may be omitted. That is, the rotor 120 may have at least one of the first surface 1221 and the second surface 1231.

In this way, for example, at one axial end portion of the rotor 120, a so-called C-bevel (chamfer) that obliquely cuts off an edge of a corner is disposed on at least one of a corner on the radially inner direction Di side of the rotor tube portion 122 and a corner on the radially outer direction Do side of the rotor flange portion 123 over the circumferential direction. It is to be noted that the above-described corner on the radially inner direction Di side is a corner portion formed by an axially one end surface and a radially inside surface of the rotor tube portion 122. The above-described corner on the radially outer direction Do side is a corner portion formed by an axially one end surface and a radially outside surface of the rotor flange portion 123.

With such a configuration, the rigidity of the base portion 140 is improved while the base portion 140 maintains a sufficient clearance with respect to the axially one end portion of the rotor tube portion 122 and the rotor flange portion 123. Even if a base recess 142 to be described later for maintaining the clearance with respect to the axially one end portion of the rotor tube portion 122 and the rotor flange portion 123 is formed, for example, on the base portion 140, the base recess 142 is made smaller by disposing the chamfered portion above described. That is, since a thinned portion (referred to as a thin portion 143 hereinafter) by the base recess 142 is further reduced, the rigidity of the base portion 140 is improved and the generation of the vibration and the noise of the motor 100 is suppressed.

A step 126 is preferably disposed on an axially the other end surface of the rotor flange portion 123. As illustrated in FIG. 3, for example, the other axial end surface of the rotor flange portion 123 includes a first other axial end surface 1261 and a second axially the other end surface 1262. The first other axial end surface 1261 expands in the radial direction and the circumferential direction. The second axially the other end surface 1262 is disposed at a radial position different from the first other axial end surface 1261 and expands in the radial direction and the circumferential direction. The second axially the other end surface 1262 is disposed in the one axial direction Da1 with respect to the first other axial end surface 1261. The first other axial end surface 1261 is preferably disposed in the radially outer direction Do with respect to the second axially the other end surface 1262, and more preferably disposed at a radially outer end portion of the other axial end surface of the rotor flange portion 123.

The other axial end surface of the rotor flange portion 123 further includes a first connection surface 1263. The first connection surface 1263 expands at least in the axial direction and the circumferential direction, and connects the first other axial end surface 1261 and the second axially the other end surface 1262. An axially the other end portion of the first connection surface 1263 is connected to, for example, a radially inner end portion of the first other axial end surface 1261. One axial end portion of the first connection surface 1263 is connected to a radially outer end portion of the second axially the other end surface 1262.

In this way, for example, when the disk-shaped storage medium 510 or the like is disposed on an axially the other end portion of the rotor flange portion 123, the storage medium 510 placed on the first other axial end surface 1261 does not come into contact with the second axially the other end surface 1262. Thus, the disk-shaped storage medium 510 is kept from inclining with respect to a horizontal plane perpendicular to the axial direction. Consequently, vibration and noise of the storage medium 510 are kept from generating when the storage medium 510 is rotated by driving the motor 100. In addition, since the disk-shaped storage medium 510 is arranged horizontally with respect to the central axis CX, the writing and the reading to the storage medium 510 are performed more accurately. Thus, a storage capacity of the storage medium 510 is improved.

In FIG. 3, the number of step 126 is the singular number, but is not limited to this example, and may be the plural number. FIG. 4 is a sectional view illustrating another configuration example of the rotor flange portion 123. FIG. 4 corresponds to a portion IV surrounded by a broken line in FIG. 3.

In FIG. 4, for example, the number of steps 126 is two. The other axial end surface of the rotor flange portion 123 further includes a third axially the other end surface 1264. The third axially the other end surface 1264 is disposed between the first other axial end surface 1261 and the second axially the other end surface 1262 in the radial direction and expands in the radial direction and the circumferential direction. The third axially the other end surface 1264 is preferably disposed in the radially inner direction Di with respect to the first other axial end surface 1261, and is preferably disposed in the radially outer direction Do with respect to the second axially the other end surface 1262.

The first connection surface 1263 connects the first other axial end surface 1261 and the third axially the other end surface 1264. An axially the other end portion of the first connection surface 1263 is connected to, for example, a radially inner end portion of the first other axial end surface 1261. The axially one end portion of the first connection surface 1263 is connected to a radially outer end portion of the third axially the other end surface 1264.

The other axial end surface of the rotor flange portion 123 further includes a second connection surface 1265. The second connection surface 1265 expands at least in the axial direction and the circumferential direction, and connects the third axially the other end surface 1264 and the second axially the other end surface 1262. An axially the other end portion of the second connection surface 1265 is connected to, for example, a radially inner end portion of the third axially the other end surface 1264. One axial end portion of the second connection surface 1265 is connected to the radially outer end portion of the second axially the other end surface 1262.

The third axially the other end surface 1264 is disposed in the one axial direction Da1 with respect to the first other axial end surface 1261 and in the other axial direction Da2 with respect to the second axially the other end surface 1262. With this configuration, an axial interval (that is, the axial thickness) between the third axially the other end surface 1264 and the axially one end surface of the rotor flange portion 123 is larger than an axial interval between the second axially the other end surface 1262 and the axially one end surface of the rotor flange portion 123. Thus, the rigidity of the rotor flange portion 123 is improved while the disk-shaped storage medium 510 is kept from inclining with respect to the horizontal plane perpendicular to the axial direction. Consequently, for example, the rotor flange portion 123 is kept from deforming when the storage medium 510 is attached to the rotor 120.

The present disclosure is not limited to the example of FIG. 4, and the number of steps 126 may be the plural number larger than two.

In the above configuration in which the steps 126 are disposed, preferably, surface roughness of the first other axial end surface 1261 is smaller than surface roughness of a region other than the first other axial end surface 1261 in the other axial end surface of the rotor flange portion 123. The surface roughness of the first other axial end surface 1261 is, for example, finer than the surface roughness of the second axially the other end surface 1262 and the surface roughness of the third axially the other end surface 1264.

For an evaluation of the surface roughness, indexes and measurement methods defined in JIS B 0601, ISO 25178, and the like may be used. Arithmetic average roughness Ra, maximum roughness Ry, ten-point average roughness Rz, and the like, for example, may be adopted for the evaluation of the surface roughness.

In this way, the surface of the first other axial end surface 1261 of the rotor flange portion 123 is made smoother. Thus, for example, when the disk-shaped storage medium 510 or the like is disposed on the axially the other end portion of the rotor flange portion 123, balance of the storage medium 510 is easily adjusted. Furthermore, since the balance of the rotor 120 is improved by the balance adjustment, the vibration and the noise are reduced.

The above example does not exclude a configuration in which the step 126 is omitted. The other axial end surface of the rotor flange portion 123 may be flat, for example. In this case, the surface roughness of the other axial end surface of the rotor flange portion 123 is preferably made smaller than the surface roughness of the axially one end surface of the rotor flange portion 123, for example.

The clamp member 124 supports the storage media 510 together with the rotor flange portion 123. Specifically, a radially inner end portion of the clamp member 124 is supported by the rotor annular portion 121. The clamp member 124 sandwiches the layered storage media 510 together with the rotor flange portion 123 in the axial direction via the spacers 540 interposed between the storage media 510.

The magnet 125 is fixed to an inner circumferential surface of the rotor tube portion 122. As described above, the rotor 120 includes the magnet 125. The magnet 125 is opposed to the stator 130 in the radial direction. In the magnet 125, magnetic poles (N pole and S pole) that are different each other are alternately arranged in the circumferential direction. The magnet 125 may have an annular shape surrounding the central axis CX, or may have a configuration including a plurality of magnet pieces arranged in the circumferential direction.

The stator 130 has an annular shape surrounding the shaft 110 and is disposed in the other axial direction Da2 with respect to the base portion 140. As described above, the motor 100 includes the stator 130. The stator 130 is opposed to the magnet 125 of the rotor 120 in the radial direction, and rotates the rotor 120 according to a supply of electric power.

The stator 130 includes a stator core 131. The stator core 131 is a layered structure in which a plurality of annular magnetic materials centered on the central axis CX are layered, and is fixed to the base portion 140. The stator core 131 includes a plurality of teeth (not illustrated) protruding radially outward.

The stator 130 further includes coil portions 132 each of which is formed so that a conducting wire (not illustrated) is wound in a coil shape. Each of the coil portions 132 is formed by winding the conducting wire around the tooth via an insulator (not illustrated).

The base portion 140 expands in the radial direction on the one axial direction 1 side of the shaft 110. As described above, the motor 100 includes the base portion 140. In the present example embodiment, the base portion 140 expands in the radially outer direction from the axially one end portion of the shaft 110. The base portion 140 is molded by casting, for example, and is aluminum die-cast in the present example embodiment. In the present example embodiment, the base portion 140 is integrated with the bottom plate 531, but is not limited to this example, and may be a separate body.

An opening 141 is disposed in the base portion 140. The opening 141 penetrates the base portion 140 in the axial direction. The axially one end portion of the shaft 110 is inserted into the opening 141 and fixed to the base portion 140.

The base portion 140 further includes the base recess 142. The base recess 142 is recessed in the one axial direction Da1 and is opposed to the rotor flange portion 123 in the axial direction. The base recess 142 is an annular groove centered on the central axis CX, and is disposed on the other axial direction Da2 side of the base portion 140. An opening portion of the base recess 142 faces the rotor flange portion 123. The base recess 142 is superimposed on the entire rotor flange portion 123 when viewed from the axial direction, and accommodates at least the axially one end portion of the rotor flange portion 123.

An inner surface of the base recess 142 includes a bottom surface 1421, an inside surface 1422 on the radially inner direction Di side, and an inside surface 1423 on the radially outer direction Do side. Each of the bottom surface 1421 and the inside surfaces 1422, 1423 has an annular shape centered on the central axis CX. The bottom surface 1421 expands in the radial direction and extends in the circumferential direction. The bottom surface 1421 faces the other axial direction Da2 and is opposed to the axially one end portion of the rotor tube portion 122 and the rotor flange portion 123 in the axial direction with a clearance. The inside surface 1422 expands from a radially inner end portion of the bottom surface 1421 in the other axial direction Da2 and the radially inner direction Di and extends in the circumferential direction. The inside surface 1422 is opposed to the first surface 1221 of the rotor tube portion 122 with a gap. The inside surface 1423 expands from a radially outer end portion of the bottom surface 1421 in the other axial direction Da2 and the radially outer direction Do and extends in the circumferential direction. The inside surface 1423 is opposed to the second surface 1231 of the rotor flange portion 123 with a gap.

A rib 144 may be disposed inside the base recess 142. FIG. 5A is a sectional view illustrating a configuration example of the rib 144 as viewed from the circumferential direction. FIG. 5B is a perspective view of the base recess 142 in which the ribs 144 are disposed. FIG. 5A corresponds to the portion IV surrounded by the broken line in FIG. 3.

Each rib 144 has a plate shape and protrudes in the other axial direction Da2 from the bottom surface 1421 of the base recess 142 facing the other axial direction Da2. The base portion 140 includes the ribs 144. Radially end portions of each rib 144 are connected to the inside surfaces 1422, 1423 of the base recess 142 that face the radial direction. By arranging the ribs 144 in the base recess 142, a decrease in the rigidity of the base portion 140 due to the arrangement of the base recess 142 is suppressed or eliminated.

In FIGS. 5A and 5B, the ribs 144 are the plural number and are arranged in the circumferential direction. The plurality of ribs 144 are preferably arranged at equal intervals in the circumferential direction. However, the above-described example does not exclude a configuration in which the plurality of ribs 144 are arranged at different intervals in the circumferential direction, and does not exclude a configuration in which the number of the ribs 144 is the singular number. The number, shape, arrangement, and the like of the ribs 144 are enabled to be appropriately set according to a vibration frequency and a vibration order that are generated in the base portion 140. However, the examples of FIGS. 5A and 5B do not exclude a configuration in which no rib 144 is disposed inside the base recess 142.

A detailed configuration of the rotor 120 will be described. The rotor 120 further includes the sleeve 1, a rotor hub 2, and a yoke 3.

The sleeve 1 has a tubular shape surrounding the central axis CX. The shaft 110 is inserted into the sleeve 1. The sleeve 1 is formed of a metal material, a resin material, or the like, and is rotatably supported by the shaft 110 around the central axis CX. The sleeve 1 is opposed to the shaft 110 and the thrust tube portions 111 and has a gap with respect to the shaft 110 and the thrust tube portions 111. This gap is filled with a fluid (not illustrated) such as lubricating oil or gas.

The sleeve 1 includes a pair of sleeve recesses 11, a pair of end caps 12, and a dynamic pressure groove (not illustrated).

The sleeve recesses 11 are disposed at both end portions in the axial direction of the sleeve 1 respectively, and each of them is recessed from the end portion toward a central portion in the axial direction of the sleeve 1. The thrust tube portion 111 is accommodated in each sleeve recess 11.

The end caps 12 are fitted into the sleeve recesses 11 at both end portions in the axial direction of the sleeve 1 respectively to cover between the shaft 110 and axial end portions of the sleeve 1 in the radial direction. Each end cap 12 has an annular shape surrounding the shaft 110 with a clearance in the radial direction, and is disposed on an axial outer side (in a direction from the central portion to the end portion in the axial direction of the sleeve 1) with respect to the thrust tube portion 111.

The dynamic pressure groove is disposed on an inner surface of the sleeve 1. The dynamic pressure groove is a groove for generating dynamic pressure in the fluid interposed between the sleeve 1 and both the shaft 110 and the thrust tube portions 111. The dynamic pressure groove may be disposed on the shaft 110 side and the thrust tube portion 111 side. In the part where the sleeve 1 and both the shaft 110 and the thrust tube portions 111 are opposed to each other via the fluid, a portion having the dynamic pressure groove functions as a fluid hydrodynamic bearing. The fluid hydrodynamic bearing rotatably supports the rotor 120. Specifically, when the rotor 120 rotates with respect to the shaft 110, the dynamic pressure is generated in the fluid by the dynamic pressure groove in the above-described portion. This dynamic pressure separates the sleeve 1 from the shaft 110 and the thrust tube portions 111. As a result, the rotor 120 is rotatably supported in a non-contact state of the sleeve 1 and both the shaft 110 and the thrust tube portions 111. The present disclosure is not limited to the above example, and the bearing portion that rotatably supports the rotor 120 may be other than the fluid hydrodynamic bearing, and may be, for example, a ball bearing or a sliding bearing.

The rotor hub 2 is fixed to a radially outer end portion of the sleeve 1 and is rotatable around the central axis CX together with the sleeve 1. The rotor hub 2 may be integrated with or separated from the sleeve 1. In the present example embodiment, an aluminum-based metallic material is used for the rotor hub 2. Since this makes it possible to further reduce a difference in a coefficient of thermal expansion between the storage medium 510 and a member in contact with the storage medium 510, thermal distortion during driving is suppressed or eliminated. However, the present disclosure is not limited to this example, and a metallic material other than the aluminum-based metallic material or a resin material may be used for the rotor hub 2.

The rotor hub 2 includes a hub tube portion 21, a hub flange portion 22, and a hub annular portion 23. The hub tube portion 21 has a tubular shape extending in the axial direction and is disposed in the radially outer direction Do with respect to the stator 130. The hub flange portion 22 expands in the radially outer direction Do from one axial end portion of the hub tube portion 21. The hub annular portion 23 is disposed in the other axial direction with respect to the yoke 3 (in particular, a yoke tube portion 31 to be described later) and expands in the radially inner direction Di from an axially the other end portion of the hub tube portion 21. The rotor 120 has the hub annular portion 23. A radially inner end portion of the hub annular portion 23 is connected to the sleeve 1.

The yoke 3 is formed of a magnetic material having higher rigidity than the rotor hub 2 (in particular, the hub flange portion 22). In the present example embodiment, the material of the yoke 3 is ferritic or martensitic stainless steel. In the present example embodiment, the yoke 3 is fixed to the rotor hub 2 by adhesive B. However, the present disclosure is not limited to the above example, and the yoke 3 may be integrally molded with the rotor hub 2.

The yoke 3 includes the yoke tube portion 31, the first yoke flange portion 32, and a second yoke flange portion 33.

The yoke tube portion 31 is disposed on a radially inside surface of the hub tube portion 21. The magnet 125 is disposed on a radially inside surface of the yoke tube portion 31. In the present example embodiment, the yoke tube portion 31 has a tubular shape centered on the central axis CX and surrounds the stator 130. However, the present disclosure is not limited to the above example, and the yoke tube portion 31 may have a configuration in which a plurality of yoke pieces extending in the axial direction are arranged in the circumferential direction.

The yoke tube portion 31 constitutes the rotor tube portion 122 together with the hub tube portion 21. In other words, the rotor tube portion 122 includes the yoke tube portion 31 and the hub tube portion 21. The hub tube portion 21 holds the magnet 125 via the yoke tube portion 31.

An axially the other end portion of the yoke tube portion 31 is preferably opposed to the hub annular portion 23 in the axial direction with a clearance.

This makes it possible to store the adhesive B protruding from between the yoke tube portion 31 and the hub tube portion 21 in the above-described clearance when the yoke tube portion 31 is fixed to the radially inside surface of the hub tube portion 21 by adhesive B, for example. Thus, the adhesive B is suppressed from protruding in the radially inner direction Di with respect to the yoke tube portion 31 and adhering to other portions (the stator 130 and the like) of the motor 100. In particular, rotation failure, a stuck state, and the like of the rotor 120 caused by adhesive B interposed between the coil portions 132 and the rotor 120 (for example, the hub annular portion 23) are eliminated.

When the yoke tube portion 31 is disposed on the radially inside surface of the hub tube portion 21, the first yoke flange portion 32 is brought into contact with at least the axially one end portion of the hub tube portion 21. Further, when the hub flange portion 22 is disposed on an axially the other end portion of the first yoke flange portion 32, the first yoke flange portion 32 is reliably brought into contact with the hub flange portion 22 in the axial direction. Thus, the rigidity of the rotor flange portion 123 is reliably more improved.

The yoke tube portion 31 is press-fitted into a radially inner end portion of the hub tube portion 21 and fixed to the radially inner end portion of the hub tube portion 21 via the adhesive B. However, the present disclosure is not limited to the above example, and the yoke tube portion 31 may be disposed on the radially inner end portion of the hub tube portion 21 by a shrinkage fit. In these cases, the adhesive B may be omitted. Alternatively, the yoke tube portion 31 may be integrally molded with the hub tube portion 21.

Incidentally, a groove portion 1222 that is recessed in the radial direction and extends in the circumferential direction may be disposed on at least one of the radially inside surface of the hub tube portion 21 and a radially outside surface of the yoke tube portion 31. The rotor 120 has the groove portion 1222. FIG. 6A is a sectional view illustrating a first arrangement example of the groove portion 1222. FIG. 6B is a sectional view illustrating a second arrangement example of the groove portion 1222. FIG. 6C is a sectional view illustrating a third arrangement example of the groove portion 1222. FIGS. 6A to 6C correspond to a portion VI surrounded by a broken line in FIG. 3.

In FIG. 6A, the groove portion 1222 has hub groove portions 211, for example. Each hub groove portion 211 is disposed on the radially inside surface of the hub tube portion 21, is recessed in the radially outer direction Do, and extends in the circumferential direction. The hub groove portion 211 may have a continuous annular shape in the circumferential direction or may have an arc shape extending in the circumferential direction.

In FIG. 6A, the yoke tube portion 31 is disposed on the radially inside surface of the hub tube portion 21 by the press fit or the shrinkage fit, and is connected to the radially inside surface of the hub tube portion 21 by adhesive B. A part of the adhesive B interposed between the hub tube portion 21 and the yoke tube portion 31 is accommodated in the hub groove portions 211.

In FIG. 6A, the hub groove portions 211 are the plural number, and are arranged in the axial direction. However, the present disclosure is not limited to this example, and the hub groove portion 211 may be the singular number.

Then, in FIGS. 6B and 6C, the groove portion 1222 has yoke groove portions 311. Each yoke groove portion 311 is disposed on the radially outside surface of the yoke tube portion 31, is recessed in the radially inner direction Di, and extends in the circumferential direction. The yoke groove portion 311 may have a continuous annular shape in the circumferential direction or may have an arc shape extending in the circumferential direction.

In FIG. 6B, the yoke tube portion 31 is disposed on the radially inside surface of the hub tube portion 21 by the press fit or the shrinkage fit, and is connected to the radially inside surface of the hub tube portion 21 by adhesive B. The part of the adhesive B interposed between the hub tube portion 21 and the yoke tube portion 31 is accommodated in the yoke groove portions 311.

In FIG. 6C, the yoke tube portion 31 is integrally molded with the hub tube portion 21. Each part 212 of the hub tube portion 21 is accommodated in the yoke groove portion 311.

In FIGS. 6B and 6C, the yoke groove portions 311 are the plural number, and are arranged in the axial direction. However, the present disclosure is not limited to this example, and the yoke groove portion 311 may be the singular number.

The groove portion 1222 is not limited to the examples of FIGS. 6A to 6C, and the groove portion 1222 may have both the hub groove portions 211 and the yoke groove portions 311. Further, the groove portion 1222 may further have one or a plurality of grooves extending at least in the axial direction on at least one of the radially outside surface of the yoke tube portion 31 and the radially inside surface of the hub tube portion 21 together with at least one of the hub groove portions 211 and the yoke groove portions 311.

Alternatively, instead of at least one of the hub groove portions 211 and the yoke groove portions 311, the groove portion 1222 may have one or a plurality of the grooves extending at least in the axial direction on at least one of the radially outside surface of the yoke tube portion 31 and the radially inside surface of the hub tube portion 21.

A sectional shape of the groove portion 1222 is not limited to the examples of FIGS. 6A to 6C. A sectional shape of each of the hub groove portions 211 or the yoke groove portions 311 may be a semicircular shape or an n-gonal shape (n is a positive integer greater than or equal to 3) such as a triangle or a rectangle.

The arrangement of the groove portion 1222 facilitates the arrangement of the yoke tube portion 31 on the radially inside surface of the hub tube portion 21. When the yoke tube portion 31 is press-fitted into the radially inside surface of the hub tube portion 21, for example, a contact area between the yoke tube portion 31 and the hub tube portion 21 is reduced by the arrangement of the groove portion 1222. Thus, press fit resistance of the yoke tube portion 31 to the hub tube portion 21 is reduced. Consequently, the yoke tube portion 31 is easily press-fitted, and deformations of the hub tube portion 21 and the yoke tube portion 31 due to the press fit resistance are eliminated.

When the yoke tube portion 31 is fixed to the radially inside surface of the hub tube portion 21 by adhesive B as illustrated in FIGS. 6A and 6B, the adhesive B is stored in the groove portion 1222. Thus, the adhesive B is sufficiently interposed between the yoke tube portion 31 and the hub tube portion 21. Consequently, fixing strength of the yoke tube portion 31 to the hub tube portion 21 is improved.

When the yoke tube portion 31 is installed in a metal mold and the hub tube portion 21 is insert-molded as illustrated in FIG. 6C, the groove portion 1222 is disposed on the radially outside surface of the yoke tube portion 31. In this case, adhesion of the yoke tube portion 31 to the hub tube portion 21 is improved due to an increase of the contact area between the hub tube portion 21 and the yoke tube portion 31. The parts 212 of the hub tube portion 21 are fitted into the groove portion 1222 to be arranged. Thus, the fixing strength of the yoke tube portion 31 to the hub tube portion 21 is improved due to the fitting structure of the parts 212 of the hub tube portion 21 to the groove portion 1222.

The above example does not exclude a configuration in which the groove portion 1222 is disposed on neither the radially inside surface of the hub tube portion 21 nor the radially outside surface of the yoke tube portion 31.

Then, the first yoke flange portion 32 expands in the radially outer direction Do from one axial end portion of the yoke tube portion 31 and extends in the circumferential direction. In the present example embodiment, the first yoke flange portion 32 has an annular shape surrounding the central axis CX. The first yoke flange portion 32 is fixed to the axially one end portion of the hub tube portion 21 via the adhesive B. However, the present disclosure is not limited to this example, and the first yoke flange portion 32 may be in direct contact with the axially one end portion of the hub tube portion 21 in the axial direction. Alternatively, the first yoke flange portion 32 may be integrally molded with the hub flange portion 22.

In the present example embodiment, the first yoke flange portion 32 constitutes the rotor flange portion 123 together with the hub flange portion 22. Since the rotor flange portion 123 includes the first yoke flange portion 32, the axial thickness of the rotor flange portion 123 is further reduced while the rigidity of the rotor flange portion 123 is maintained. Thus, an axial thickness of the thin portion 143 in the vicinity of the rotor flange portion 123 in the base portion 140 is further increased. The thin portion 143 is, for example, a portion between the bottom surface 1421 of the base recess 142 and an axially one end surface of the base portion 140. By replacement of reducing the thickness of the rotor flange portion 123 with increasing a thickness of a base portion 140, rigidity of the base portion 140 is improved. Furthermore, when the motor 100 is driven, the thin portion 143 of the base portion 140 is suppressed from vibrating, so the generation of the vibration and the noise of the motor 100 is effectively suppressed.

The rotor flange portion 123 further includes the hub flange portion 22. The hub flange portion 22 is disposed on the axially the other end portion of the first yoke flange portion 32. An axial thickness W1 of the hub flange portion 22 is preferably equal to or less than an axial thickness W2 of the first yoke flange portion 32 (refer to FIG. 3). The axial thickness W1 is an interval in the axial direction between a portion closest to the other axial direction Da2 side and an axially one end surface of the hub flange portion 22. In FIG. 3, for example, the axial thickness W1 is the interval in the axial direction between the first other axial end surface 1261 and the axially one end surface of the hub flange portion 22. The axial thickness W2 is an interval in the axial direction between an axially the other end surface and an axially one end surface of the first yoke flange portion 32. The axial thickness W2 is, for example, 0.6 mm or more and 1.2 mm or less. The axial thickness W2 is, preferably, 0.8 mm or more and 1.1 mm or less. Within this range, the rotor flange portion 123 is thinned while maintaining the rigidity of the rotor flange portion 123. When the axial thickness W2 is less than 0.6 mm (W2<0.6 mm), it is difficult to maintain the rigidity of the rotor flange portion 123. When the axial thickness W2 is more than 1.2 mm (W2>1.2 mm), there is a possibility that the vibration and the noise are generated due to thinning of the thin portion 143 of the base portion 140.

By disposing the hub flange portion 22 having the axial thickness W1 equal to or less than the axial thickness W2 of the first yoke flange portion 32 on the axially the other end portion of the first yoke flange portion 32, the hub flange portion 22 is disposed on another axial direction side of the rotor flange portion 123 while an increase in the axial thickness of the rotor flange portion 123 is suppressed. Thus, a material different from the material of the portion (the first yoke flange portion 32) on the one axial direction side is usable for the portion (that is, the hub flange portion 22) on the other axial direction side of the rotor flange portion 123. With this configuration, for example, when the disk-shaped storage medium 510 or the like is disposed on the axially the other end portion of the rotor flange portion 123, a material having a coefficient of thermal expansion close to that of the storage medium 510 is usable for the hub flange portion 22. Thus, the thermal distortion of the rotor flange portion 123 caused by a difference in the coefficient of thermal expansion between the storage medium 510 and the hub flange portion 22 is suppressed.

In addition, by using a material having higher rigidity than the hub flange portion 22 for the first yoke flange portion 32, the rigidity of the rotor flange portion 123 is maintained or improved while the increase in the axial thickness of the rotor flange portion 123 is suppressed.

However, the above-described example does not exclude a configuration in which the axial thickness W1 is more than the axial thickness W2 (W1>W2).

The second yoke flange portion 33 extends in the radially inner direction Di from the axially the other end portion of the yoke tube portion 31 and expands in the circumferential direction. The rotor 120 has the second yoke flange portion 33. In the present example embodiment, the second yoke flange portion 33 has an annular shape surrounding the central axis CX. The second yoke flange portion 33 is disposed in the other axial direction Da2 with respect to the magnet 125.

At least a part of the second yoke flange portion 33 is superimposed on the magnet 125 in the axial direction, and is arranged, for example, at an axially the other end portion of the magnet 125. In this way, since magnetic flux of the magnet 125 passes through the second yoke flange portion 33, leakage magnetic flux of the magnet 125 is suppressed. Further, by bringing the axially the other end portion of the magnet 125 into contact with the second yoke flange portion 33, positioning in the axial direction is easily performed when arranging the magnet 125. Furthermore, due to the arrangement of the second yoke flange portion 33, when the yoke tube portion 31 is fixed to the radially inside surface of the hub tube portion 21 by adhesive B, for example, the adhesive B that protrudes from between the yoke tube portion 31 and the hub tube portion 21 is suppressed from protruding in the radially inner direction with respect to the second yoke flange portion 33. Thus, adhesion of the adhesive B to other portions (the stator 130 and the like) of the motor 100 is further suppressed.

Then, a first modification and a second modification of the example embodiment will be described. Configurations different from that of the above-described example embodiment will be described hereinafter. In addition, the components similar to those in the above-described example embodiment are denoted by the same reference numerals, and descriptions thereof may be omitted. The above-described example embodiment, the first modification, and the second modification may be arbitrarily combined as long as there is no particular contradiction.

FIG. 7 is a diagram illustrating a configuration example of the rotor flange portion 123 according to the first modification. FIG. 7 corresponds to the portion III surrounded by the broken line in FIG. 2.

In the first modification, the rotor flange portion 123 is configured with the first yoke flange portion 32. That is, the rotor flange portion 123 includes only the first yoke flange portion 32. The rotor flange portion 123 and the rotor hub 2 do not have the hub flange portion 22. In this way, the axial thickness of the rotor flange portion 123 is further reduced. Thus, an axial width of the base recess 142 is further reduced. Consequently, the rigidity of the base portion 140 is further improved by thickening the thin portion 143.

FIG. 8 is a diagram illustrating a configuration example of the rotor flange portion 123 according to the second modification. FIG. 8 corresponds to the portion III surrounded by the broken line in FIG. 2.

In the second modification, the yoke 3 is connected to one axial end portion of the rotor hub 2 by, for example, friction stir joining, welding, or the like. The rotor tube portion 122 is configured with at least the yoke tube portion 31. The rotor flange portion 123 is configured only with the first yoke flange portion 32.

In FIG. 8, the yoke tube portion 31 extends from the axially one end portion of the hub tube portion 21 in the one axial direction Da1. The present disclosure is not limited to the example of FIG. 8, and the hub tube portion 21 may be omitted. The yoke tube portion 31 may extend from a radially outer end portion of the hub annular portion 23 in the one axial direction Da1.

According to the second modification, a radial width of the base recess 142 is reduced, and the rigidity of the base portion 140 is further improved. Furthermore, the rigidity of the rotor tube portion 122 and the rotor flange portion 123 is improved. Thus, deformations of the rotor tube portion 122 and the rotor flange portion 123 due to a force acting when the disk-shaped storage media 510 are mounted and the storage media 510 are sandwiched between the clamp member 124 and the rotor flange portion 123 are eliminated.

The example embodiments described so far and modifications thereof will be collectively described hereinafter.

A motor disclosed in the present specification, for example, includes:
a shaft that extends along a central axis extending in an axial direction;
a base portion that extends in a radial direction on one axial direction side of the shaft;
a stator that is disposed in another axial direction with respect to the base portion and that surrounds the shaft; and
a rotor that is rotatable around the central axis,
wherein
the rotor has:
a rotor tube portion that surrounds the stator;
a magnet that is opposed to the stator in the radial direction; and
a rotor flange portion that extends in a radially outer direction from one axial end portion of the rotor tube portion,
the rotor tube portion has a yoke tube portion and a hub tube portion,
the yoke tube portion is disposed on a radially inside surface of the hub tube portion,
the hub tube portion holds the magnet via the yoke tube portion,
the rotor flange portion has at least a first yoke flange portion, and
the first yoke flange portion expands in the radially outer direction from one axial end portion of the yoke tube portion (first configuration).

The motor according to the first configuration that may be another configuration (second configuration), wherein
the rotor flange portion further has a hub flange portion,
the hub flange portion expands in the radially outer direction from one axial end portion of the hub tube portion and is disposed on an axially the other end portion of the first yoke flange portion, and
an axial thickness of the hub flange portion is equal to or less than an axial thickness of the first yoke flange portion.

The motor according to the first configuration that may be still another configuration (third configuration), wherein
the rotor flange portion is configured only with the first yoke flange portion.

The motor according to any one of the first to third configurations that may be still another configuration (fourth configuration), wherein
the rotor has:
at least one of
a first surface disposed on a radially inner end portion of the axially one end portion of the rotor tube portion and extending in a circumferential direction; and
a second surface disposed on a radially outer end portion of one axial end portion of the rotor flange portion and extending in the circumferential direction, the first surface extends straight toward the other axial direction as the first surface goes in a radially inner direction as viewed from the circumferential direction, and the second surface extends straight toward the other axial direction as the second surface goes in the radially outer direction as viewed from the circumferential direction.

The motor according to any one of the first to fourth configurations that may be still another configuration (fifth configuration), wherein the rotor further has a hub annular portion that is disposed in the other axial direction with respect to the yoke tube portion and that expands in the radially inner direction from the hub tube portion, and an axially the other end portion of the yoke tube portion is opposed to the hub annular portion in the axial direction with a clearance.

The motor according to any one of the first to fifth configurations that may be still another configuration (sixth configuration), wherein the rotor further has a second yoke flange portion that extends in the radially inner direction from the axially the other end portion of the yoke tube portion, and at least a part of the second yoke flange portion is superimposed on the magnet in the axial direction.

The motor according to any one of the first to sixth configurations that may be still another configuration (seventh configuration), wherein an axially the other end surface of the rotor flange portion has:

a first other axial end surface expanding in the radial direction and the circumferential direction; and a second axially the other end surface that is disposed at a radial position different from the first other axial end surface and that expands in the radial direction and the circumferential direction, and the second axially the other end surface is disposed in the one axial direction with respect to the first other axial end surface.

The motor according to the seventh configuration that may be still another configuration (eighth configuration), wherein the other axial end surface of the rotor flange portion further has a third axially the other end surface that is disposed between the first other axial end surface and the second axially the other end surface in the radial direction and that expands in the radial direction and the circumferential direction, and the third axially the other end surface is disposed in the one axial direction with respect to the first other axial end surface and in the other axial direction with respect to the second axially the other end surface.

The motor according to the seventh or eighth configuration that may be still another configuration (ninth configuration), wherein surface roughness of the first other axial end surface is smaller than surface roughness of a region other than the first other axial end surface in the other axial end surface of the rotor flange portion.

The motor according to any one of the first to ninth configurations that may be still another configuration (tenth configuration), wherein the rotor further has a groove portion that is recessed in the radial direction and that extends in the circumferential direction, and the groove portion is disposed on at least one of a radially outside surface of the yoke tube portion and the radially inside surface of the hub tube portion.

The motor according to any one of the first to tenth configurations that may be still another configuration (eleventh configuration), wherein the base portion has:

a base recess that is recessed in the one axial direction and that is opposed to the rotor flange portion in the axial direction; and a rib that has a plate shape and that protrudes in the other axial direction from a bottom surface of the base recess facing the other axial direction, and a radially end portion of the rib is connected to an inside surface of the base recess that faces the radial direction.

A disk drive device disclosed in the present specification, for example, includes:

the motor according to any one of the first to eleventh configurations;

a storage medium that has a disk shape and that is supported by the rotor of the motor; and an access assembly that performs at least one of reading and writing of information to the storage medium (twelfth configuration).

The disk drive device according to the twelfth configuration that may be another configuration (thirteenth configuration), further includes:

a housing that accommodates the motor, the storage medium, and the access assembly, wherein the housing is filled with a gas having a density lower than a density of air.

The present disclosure is useful, for example, for a motor that accurately rotates a rotor and a device that drives a disk with the motor.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a shaft that extends along a central axis extending in an axial direction;
a base portion that extends in a radial direction on one axial direction side of the shaft;
a stator that is located on another axial direction with respect to the base portion and that surrounds the shaft; and
a rotor that is rotatable around the central axis;
wherein
the rotor includes:
a rotor tube portion that surrounds the stator;
a magnet that is opposed to the stator in the radial direction; and
a rotor flange portion that extends in a radially outer direction from one axial end portion of the rotor tube portion;
the rotor tube portion includes a yoke tube portion and a hub tube portion;
the yoke tube portion is located on a radially inside surface of the hub tube portion;
the hub tube portion holds the magnet via the yoke tube portion;

the rotor flange portion includes at least a first yoke flange portion; and the first yoke flange portion extends in the radially outer direction from one axial end portion of the yoke tube portion.

2. The motor according to claim 1, wherein
the rotor flange portion further includes a hub flange portion;
the hub flange portion extends in the radially outer direction from one axial end portion of the hub tube portion and is located on another axial end portion of the first yoke flange portion; and
an axial thickness of the hub flange portion is equal to or less than an axial thickness of the first yoke flange portion.

3. The motor according to claim 1, wherein
the rotor flange portion is configured with only the first yoke flange portion.

4. The motor according to claim 1, wherein
the rotor includes at least one of:
a first surface located on a radially inner end portion of the axially one end portion of the rotor tube portion and extending in a circumferential direction; and
a second surface located on a radially outer end portion of one axial end portion of the rotor flange portion and extending in the circumferential direction;
the first surface extends straight toward the other axial direction as the first surface extends in a radially inner direction as viewed from the circumferential direction; and
the second surface extends straight toward the other axial direction as the second surface extends in the radially outer direction as viewed from the circumferential direction.

5. The motor according to claim 1, wherein
the rotor further includes a hub annular portion that is located in the other axial direction with respect to the yoke tube portion and that extends in the radially inner direction from the hub tube portion; and
another axial end portion of the yoke tube portion is opposed to the hub annular portion in the axial direction with a clearance.

6. The motor according to claim 1, wherein
the rotor further includes a second yoke flange portion that extends in the radially inner direction from the other axial end portion of the yoke tube portion; and
at least a portion of the second yoke flange portion is superimposed on the magnet in the axial direction.

7. The motor according to claim 1, wherein
another axial end surface of the rotor flange portion includes:
a first other axial end surface expanding in the radial direction and the circumferential direction; and a second other axial end surface that is located at a radial position different from the first other axial end surface and that expands in the radial direction and the circumferential direction; and
the second other axial end surface is located in the one axial direction with respect to the first other axial end surface.

8. The motor according to claim 7, wherein
the other axial end surface of the rotor flange portion further includes a third other axial end surface that is located between the first other axial end surface and the second other axial end surface in the radial direction and that extends in the radial direction and the circumferential direction; and
the third other axial end surface is located in the one axial direction with respect to the first other axial end surface and in the other axial direction with respect to the second other axial end surface.

9. The motor according to claim 7, wherein
a surface roughness of the first other axial end surface is smaller than a surface roughness of a region other than the first other axial end surface in the other axial end surface of the rotor flange portion.

10. The motor according to claim 1, wherein
the rotor further includes a groove portion that is recessed in the radial direction and that extends in the circumferential direction; and
the groove portion is located on at least one of a radially outside surface of the yoke tube portion and the radially inside surface of the hub tube portion.

11. The motor according to claim 1, wherein
the base portion includes:
a base recess that is recessed in the one axial direction and that is opposed to the rotor flange portion in the axial direction; and
a rib that has a plate shape and that protrudes in the other axial direction from a bottom surface of the base recess opposing the other axial direction; and
a radially end portion of the rib is connected to an inside surface of the base recess that opposes the radial direction.

12. A disk drive device comprising:
the motor according to claim 1;
a storage medium that has a disk shape and that is supported by the rotor of the motor; and
an access assembly that performs at least one of reading and writing of information to the storage medium.

13. The disk drive device according to claim 12, further comprising:
a housing that accommodates the motor, the storage medium, and the access assembly; wherein
the housing is filled with a gas having a density lower than a density of air.

* * * * *